United States Patent [19]

Porro et al.

[11] Patent Number: 5,756,892

[45] Date of Patent: May 26, 1998

[54] APPARATUS FOR MEASURING AMBIENT PRESSURE WITHIN A GASEOUS FLOW FIELD

[75] Inventors: A. Robert Porro, Medina; Michael A. Ernst, Bay Village, both of Ohio

[73] Assignee: The United States of America as represented by the United States National Aeronautics and Space Administration, Washington, D.C.

[21] Appl. No.: 813,582

[22] Filed: Feb. 27, 1997

[51] Int. Cl.⁶ .................................................. G01M 9/06
[52] U.S. Cl. .............................. 73/147; 73/865.6; 73/756
[58] Field of Search ............................ 73/147, 178 R, 73/31.04, 865.6, 756

[56] References Cited

U.S. PATENT DOCUMENTS

| | | |
|---|---|---|
| 2,315,756 | 4/1943 | Warner . |
| 3,585,859 | 6/1971 | DeLeo et al. . |
| 3,677,079 | 7/1972 | Hoeflinger . |
| 4,703,661 | 11/1987 | Evers ........................ 73/861.66 |
| 4,783,994 | 11/1988 | Ashby, Jr. . |

*Primary Examiner*—George M. Dombroske
*Assistant Examiner*—Joseph L. Felber
*Attorney, Agent, or Firm*—Kent N. Stone

[57] ABSTRACT

The invention as disclosed herein teaches apparatus whereby the instantaneous dynamic static pressure and the steady-state static pressure may be simultaneously measured within a supersonic or subsonic gaseous fluid flow field. The dynamic static pressure is measured by an electronic transducer and the steady-state static pressure is measured by pneumatic means.

8 Claims, 3 Drawing Sheets

5,756,892

1

APPARATUS FOR MEASURING AMBIENT PRESSURE WITHIN A GASEOUS FLOW FIELD

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

1. Field of the Invention

The present invention relates to an improved static pressure measuring probe, of the type typically used within wind tunnel testing facilities, to measure the dynamic and steady-state static pressure of the air stream flowing therein. More specifically the present invention relates to a static pressure probe which is capable of providing a near-instantaneous static pressure measurement in a fluid flow field.

2. Prior Art

Conventional flow field static pressure measurement probes typically comprise pneumatic pressure passages fluidly connected to extended lengths of tubing whereby the static pressure, as sensed, is fluidly transmitted, through the tubing, to pressure measurement transducers located some distance away from the location of actual pressure measurement. Because of the extended length of tubing between the transducers and the point of actual static pressure measurement the volume of fluid, within the tubing, tends to damp out rapid fluctuations in static pressure at the probe's sensing location. Thus, the transducer tends to measure a time-averaged steady-state static pressure rather than an instantaneous, dynamic, static pressure. A significant time lag may also be present between the time when the pressure was sensed and when it is actually measured by the remote transducer.

SUMMARY OF THE INVENTION

The present invention comprises a modular pressure sensing probe particularly suitable for use in simultaneously measuring both the steady-state and dynamic static pressure within an aerodynamic wind tunnel. With known modifications the probe, as taught herein, may be easily converted for use in a supersonic or subsonic fluid flow fields.

The measurement probe as taught herein comprises a cylindrical probe stem secured within a typical wind tunnel and aligned with the anticipated, free stream, flow field within the tunnel. Removably attached to the stem is a static pressure sensing tip having therein a plenum which, by means of passageways through the outer shell of the tip affects fluidic communication between the plenum and the free stream ambient pressure.

An instrumentation cartridge having therein an electronic pressure sensing transducer, is removably contained within the probe stem such that when the probe tip is assembled to the stem the pressure sensing element of the transducer is exposed to the pressure within the plenum whereby an electronic signal, representative of the pressure within the plenum, is transmitted to an appropriate signal reading and/or recording device.

The instrumentation cartridge further incorporates a fluidic passageway extending from the probe tip plenum and connected to a pneumatic tube whereby the pneumatic pressure within the tip plenum is, pneumaticly, conveyed to

2 a remote pneumatic pressure sensing device for read-out and/or recording. Further the probe assembly, as taught herein may be easily modified for use in supersonic or subsonic applications.

Thus the herein invention teaches a static pressure measuring probe that is easily serviced, because of its modular construction, and that simultaneously measures the dynamic static pressure and the steady state static pressure of the free stream fluid within which the probe is present.

DESCRIPTION OF THE PREFERRED EMBODIMENT

Preferred Construction Of The Invention

Figure 1:
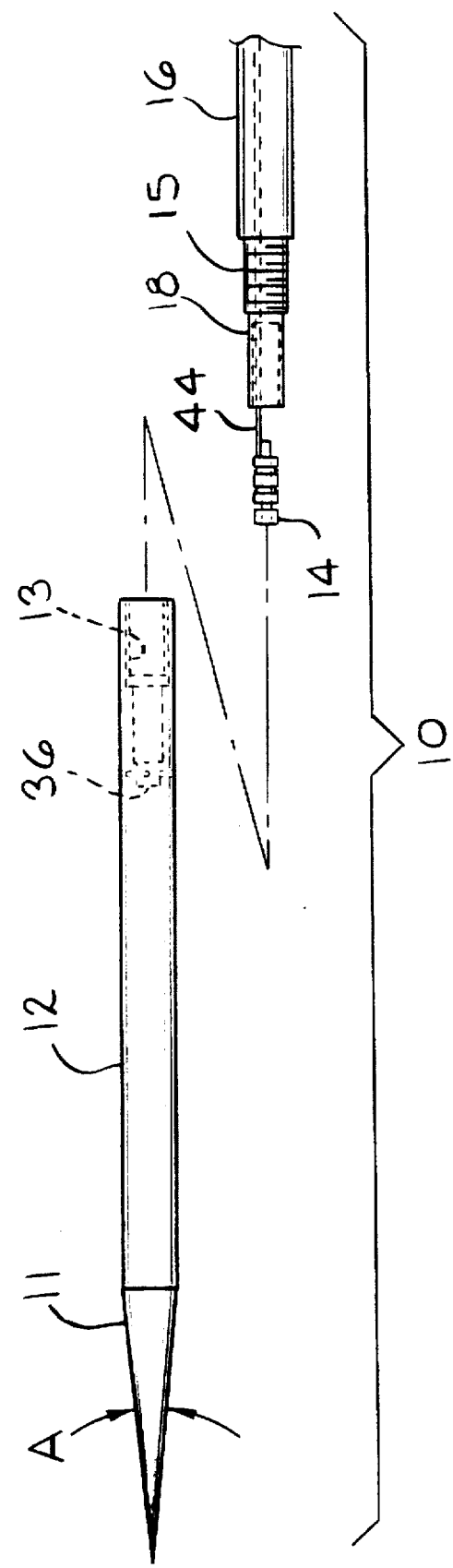
FIG. 1 shows the component parts of a modular static pressure sensing probe assembly embodying the present invention.

Referring to FIG. 1 a modular static pressure sensing probe 10 is illustrated in disassembled form. An elongated, stainless steel, cylindrical, stem 16 is typically secured to the structure of a wind tunnel (not shown). The free end 18 of stem 16 is configured to receive therein a static pressure sensing cartridge subassembly 14 as described in further detail below. Free end 18 of stem 16 is further configured to be telescopingly received within bore 13 of probe tip 12 and is threadingly attached to stem 16 by means of screw threads 15 on stem free end 18.

Although stem 16 may be of any suitable length as may be required by the physical dimensions of the particular wind tunnel within which it is installed, probe tip 12 is (for supersonic flow applications) typically about eight inches in length having a sharply pointed conical, nose 11 having an angle A of approximately ten degrees. The typical outside diameter of tip 12 and stem 16 is approximately seven-sixteenths inches.

Tip 12, except for inside bore 13, is typically solid aluminum while stem 16 is typically hollow to allow for instrumentation lines carried therethrough.

Referring now to FIGS. 2 through 5, the free end 18 of probe stem 16 comprises a reduced diameter having a threaded portion 15. Probe tip 12 is threadingly attached to screw threads 15. It is preferred that screw threads 15 be of an extremely fine pitch (40 threads per inch) to prevent the tendency for probe tip 12 to unscrew during use due to vibration, pressure loadings, and/or thermal gradient effects.

Figure 2:
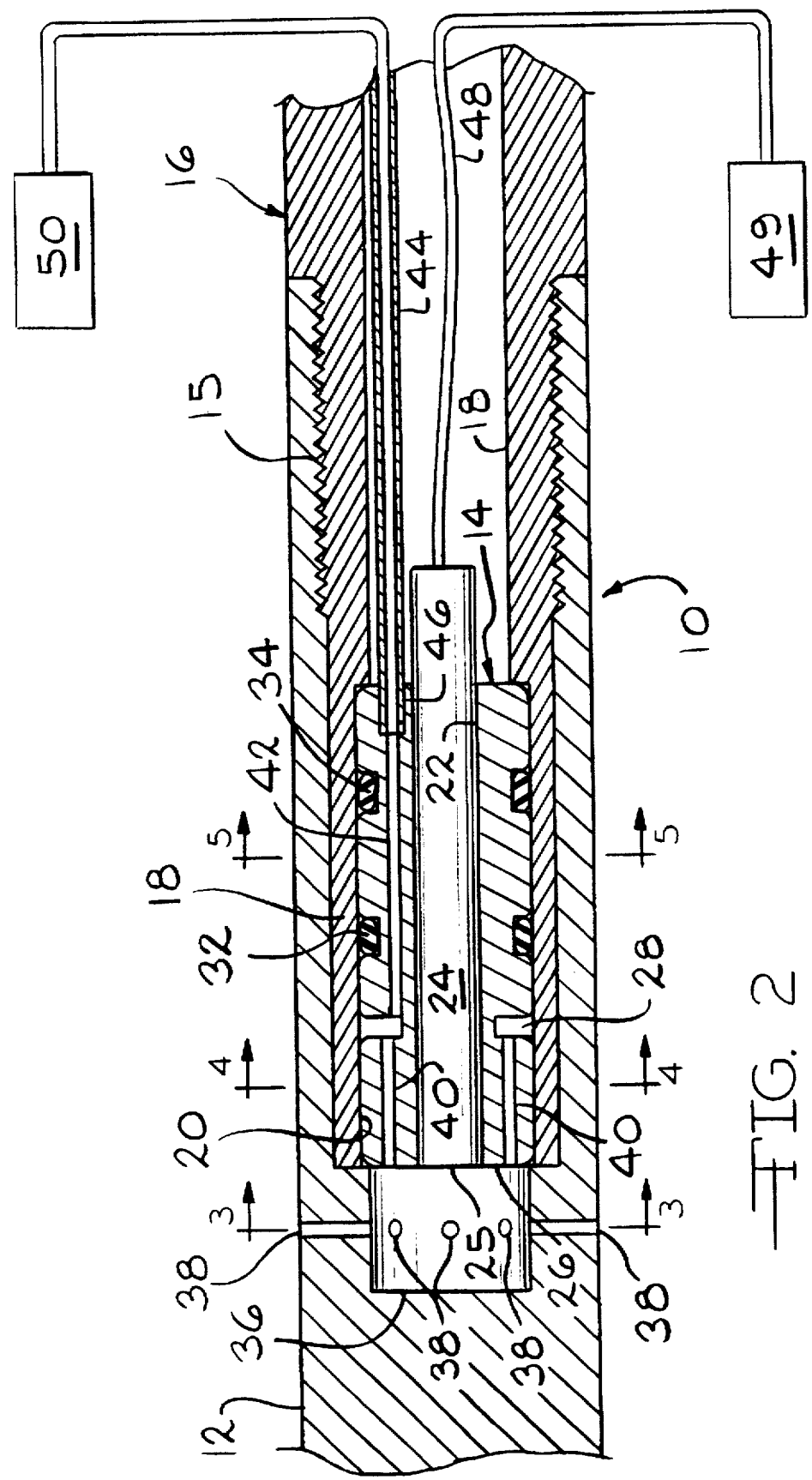
FIG. 2 presents a sectional view of the static pressure sensing probe as, illustrated in FIG. 1, taken at the juncture of the probe's stem and tip showing the location and structure of the pressure sensing cartridge therein.
Figure 5:
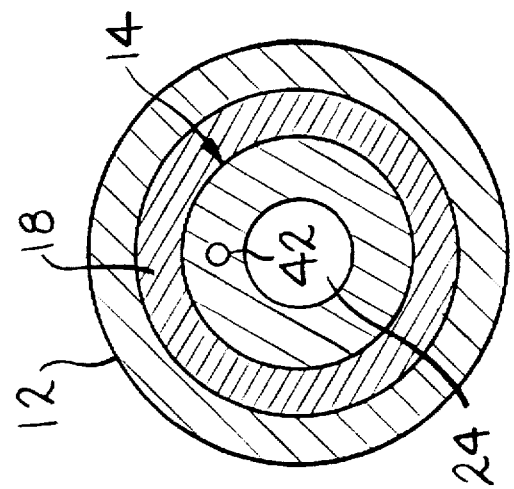
FIG. 5 is a cross section view taken along line 5—5 in FIG. 2
Figure 4:
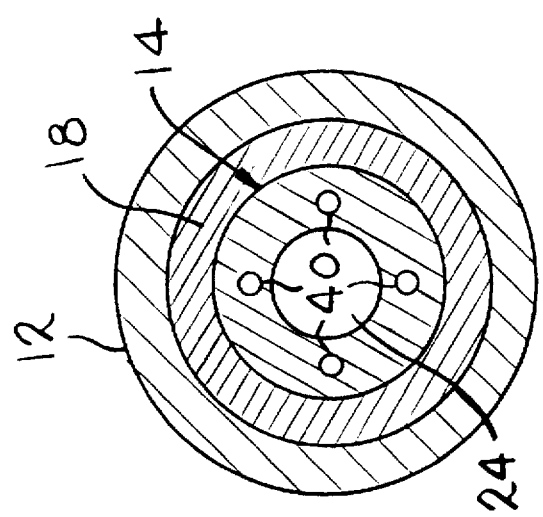
FIG. 4 is a cross section view taken along line 4—4 in FIG. 2.
Figure 3:
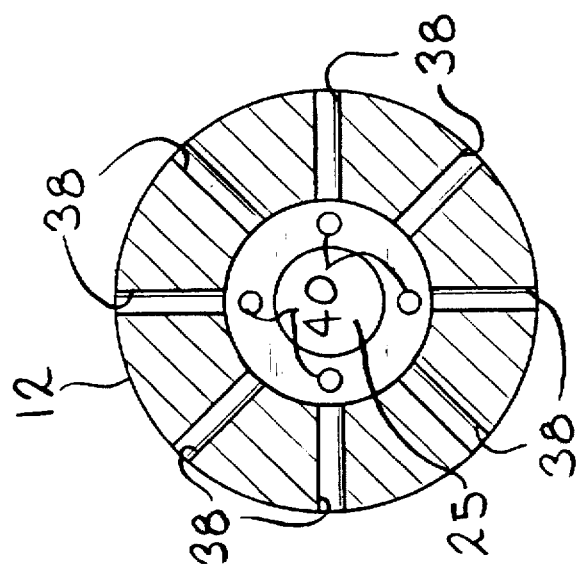
FIG. 3 is a cross section view taken along line 3—3 in FIG. 2.

Central bore 20, within the free end 18 of stem 16, removably receives therein a unitary pressure sensor cartridge 14, as best shown in FIG. 2. Cartridge 14 has a central bore 22 extending axially therethrough. Received within cartridge bore 22 is an electrical pressure sensing transducer 24. Transducer 24 is adhesively sealed and retained within bore 22 such that the pressure sensing element or surface 25 of the transducer is flush with the forward surface 26 of cartridge 14. Axially removed from surface 26 and machined into the outer periphery of cartridge 14 is a circumferential groove 28 approximately 0.05 inches deep and 0.025 inches in axial width. Groove 28 functions as an air plenum as will be described in greater detail below. Two axially spaced "O" ring seals 32 and 34 are provided to fluidly seal and frictionally secure cartridge assembly 14 within bore 20 of stem end 18.

At the forward end of bore 13, of probe tip 12, is an air plenum 36 which fluidly communicates with the forward surface 26 of cartridge 14 when the probe assembly 10 is assembled as shown in FIG. 2. Extending radially outward from plenum 36 are eight, equally spaced, air passageways, or ports, 38 providing fluid communication between plenum 36 and the fluid flow field external to probe 10.

Extending axially rearward from the forward face 26, of cartridge 14, to the cartridge air plenum 28 are four, circumferentially spaced, passageways 40 thereby providing fluid communication between probe tip plenum 36 and cartridge plenum 28.

Extending rearward from cartridge plenum 28 is axial passageway 42 which fluidly communicates with stainless steel tube 44 sealingly received within bore 46 at the rear of cartridge 14. Tube 44 and the transducer lead wires 48 are conveyed axially through stem 16 to their appropriate remote measuring and/or recording devices 49 and 50.

Operation Of The Preferred Embodiment

The static pressure probe assembly 10, as illustrated herein, is mounted in a supersonic wind tunnel having its axial centerline parallel to the intended free stream flow field with the free stream flow from left to right as viewed in the figures. At the exit end of probe stem 16 pneumatic tube 44 and electronic wires 48 are routed to appropriate measuring apparatus 49 and 50.

As the air stream flows past probe 10 static pressure ports 38 sense the ambient static pressure of the flow field. Thus the pressure within plenum 36 adjusts to that of the external flow field's ambient static pressure and because of passageways 40, within cartridge 14, the pressure within plenum 28 also adjusts to the flow field ambient static pressure which is further transmitted, through passage 42, to stainless tube 44 and on to the appropriate pneumatic pressure measuring device 50. The purpose of plenum 28 is primarily to prevent a reverse flow of fluid from tube 44 into plenum 36 should the pressure within plenum 36, at any time, instanteously fall below the pressure within tube 44 thereby preventing false indications of dynamic pressure fluctuations by transducer 24. Thus plenum 28 acts as a pseudo accumulator.

The dynamic pressure transducer 24, located within bore 22 of cartridge assembly 14, also senses the pressure within plenum 36 and, via electronic means, sends an appropriate electronic signal through transmission wires 48 to a remote signal processing apparatus 49. A suitable transducer that has been successfully used in the preferred embodiment of the invention, as taught herein, is a Kulite high sensitivity ultraminiature pressure transducer (series XCS-062 or XCW-062) produced by Kulite Semiconductor Products Inc., of Leonia, N.J.

Depending upon how well transducer 24 is integrated into the probe measurement tip 12, accurate static pressure measurements will be obtained on the order of 10 to 1.000 measurements per second. This results in a near-instantaneous static pressure measurement capability which can measure a change in pressure on the order of milliseconds. In our prototype probe, plenum 36 was slightly oversized having a 0.190 inch diameter and 0.20 inches in axial length with ports 38 each being 0.020 inches in diameter. This configuration produced a measurement rate in excess of 800 measurements per second. One skilled in gasdynamics will appreciate that the volumetric capacity of plenum 36 may be further reduced to assure that the pressure within plenum 36 reacts to the flow field dynamic pressure fluctuations more quickly. In a given situation, trial and error may be advisable to optimize the volumetric capacity of plenums 36 and 28.

Concurrently with transducer 24, the pressure in plenum 36, is measured by the pneumatic pressure measuring device 50. However, because of the volume of fluid in the pneumatic passages 44, 42, 28, and 40 upstream of device 50 the pressure measured thereby results in a steady-state pressure measurement.

Although probe tip 12, as described above, represents a standard design that has been proven to successfully measure the desired flow field parameters within a supersonic flow environment, the invention as disclosed herein may also be used to measure static pressures in a subsonic flow environment. By simply replacing supersonic tip 12 with a standard subsonic tip (not shown) having a typical subsonic hemispherical nose, the present invention may also be used to measure the dynamic and steady-state static pressure within a subsonic flow environment.

With the advent of on board computers and digital flight control systems, modern aircraft now have the capability of efficiently monitoring highly sophisticated in-flight instrumentation to better assess the flow field in which the aircraft is operating. In particular, these flight control systems attempt to determine when detrimental atmosphere conditions, such as wind shear and turbulence, are present so that corrective flight control measures may be implemented immediately to avert a mishap. The present invention is well suited as an integral component of instrumentation systems intended to augment an aircraft digital flight control system. The present invention can provide a digital flight control system an instantaneous, time-varying, trace of flow field static pressure which can be used to assess the aircraft's immediate flow field conditions.

The present invention also has potential use as a static pressure sensor in the natural gas pipeline transmission industry. A probe, as taught herein, or an array of probes may be installed in a gas transmission pipeline. As in the case of the aircraft application, the herein invention will provide an instantaneous, time-varying trace of the ambient flow field static pressure and thereby may be used to augment a transmission pipeline mass flow control system.

It is evident that many alternatives, modifications, and variations of the present invention will be apparent to those skilled in the art in light of the foregoing teachings. Accordingly, the invention is intended to embrace all such alternatives, modifications and variations as may fall within the spirit and scope of the appended claims.

We claim:

1. A probe for measuring fluid pressure within a gaseous flow field comprising:

a) a stationary probe stem, b) a probe tip having an external aerodynamic configuration suitable for the flow environment within which the flow field pressure is to be measured, said probe tip attached to said probe stem, c) electronic transducer means for measuring gaseous pressure, d) fluidic means for conveying said flow field gaseous pressure to a first plenum whereby said transducer senses and measures said flow field pressure, within said first plenum, and emits an electronic signal, representative of said pressure, e) fluidic means for conveying the gaseous pressure of said first plenum to a second plenum, f) pneumatic means for measuring gaseous pressure, g) fluidic means for conveying the gaseous pressure within said second plenum to said pneumatic means for measuring gaseous pressure whereby said pneumatic means for measuring gaseous pressure senses and measures the gaseous pressure within said second plenum and emits a signal representative of the pressure within said second plenum.

2. The probe as claimed in claim 1 wherein said probe tip is removably attached to said probe stem.

3. The probe as claimed in claim 2 wherein said electronic transducer means includes means for removably attaching said transducer means inside said stem.

4. The probe as claimed in claim 3 wherein said first plenum is within said removable tip.

5. The probe as claimed in claim 4 wherein said electronic transducer means is contained within a cartridge assembly removably received within said probe stem.

6. The probe as claimed in claim 5 wherein said second plenum is contained within said cartridge assembly.

7. Apparatus for measuring the static pressure within a gaseous flow field comprising:

a) an elongate stationary cylindrical probe stem having a fixed end and a free end, said stem having at its free end a reduced diameter portion, b) a solid, elongated probe tip body having a circular cross section and a forward and rearward end, said forward end having an external aerodynamic configuration suitable for the flow environment within which the flow field static pressure is to be measured, said probe tip telescopingly receiving the reduced diameter portion of said stem free end within a first axial bore extending forward from the rearward end of said tip, c) means for removably attaching said probe tip to said probe stem, d) a second axial bore extending forward from said first axial bore, e) at least one fluid passageway means extending from said second bore, through said tip body whereby said second bore is in fluidic communication with the fluid flow field external to said probe tip, f) a removable cartridge positioned within said reduced diameter portion of said stem, the forward end of said cartridge being flush with the forward end of said reduced diameter portion of said stem whereby said forward end of said cartridge and said second bore of said tip cooperate to form a first plenum, said cartridge further having a central bore therethrough, g) means for sealing and securing said cartridge within said reduced diameter portion of said stem, h) a second plenum within said cartridge axially spaced from the forward end of said cartridge, i) passageway means fluidly connecting said first plenum and said second plenum, j) passageway means fluidly connecting said second plenum with a pneumatic pressure measuring device, k) electronic pressure sensing means sealingly retained within said central bore of said cartridge whereby the pressure sensing element of said pressure sensing means fluidly communicates with said first plenum, senses the pressure therein and emits an electronic signal representing the magnitude of the pressure sensed within said first plenum, l) means for transmitting said electronic signal to a suitable signal measuring device.

8. The apparatus as claimed in claim 7 wherein said second plenum comprises a circumferential groove circumscribing the outer periphery of said cartridge whereby said groove and the inside cylindrical surface of said stem cooperate to form an annular plenum.

* * * * *